United States Patent
Garg et al.

(10) Patent No.: US 10,222,417 B1
(45) Date of Patent: Mar. 5, 2019

(54) SECURING ACCESS TO INTEGRATED CIRCUIT SCAN MODE AND DATA

(71) Applicant: Cadence Design Systems, Inc., San Jose, CA (US)

(72) Inventors: Akhil Garg, Greater Noida (IN); Dale Meehl, Melbourne, FL (US); Sahil Jain, Ghaziabad (IN)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 137 days.

(21) Appl. No.: 15/362,413

(22) Filed: Nov. 28, 2016

(51) Int. Cl.
| | |
|---|---|
| *G01R 31/3177* | (2006.01) |
| *G06F 1/08* | (2006.01) |
| *H04L 9/10* | (2006.01) |
| *G01R 31/317* | (2006.01) |
| *G01R 31/3185* | (2006.01) |
| *G01R 31/3183* | (2006.01) |
| *G01R 31/3181* | (2006.01) |

(Continued)

(52) U.S. Cl.
CPC ..... *G01R 31/3177* (2013.01); *G01R 31/3181* (2013.01); *G01R 31/3183* (2013.01); *G01R 31/31719* (2013.01); *G01R 31/31725* (2013.01); *G01R 31/318533* (2013.01); *G01R 31/318536* (2013.01); *G01R 31/318544* (2013.01); *G01R 31/318588* (2013.01); *G06F 1/08* (2013.01); *G06F 11/25* (2013.01); *G06F 17/505* (2013.01); *G11C 7/24* (2013.01); *H04L 9/10* (2013.01); *G11C 2029/3202* (2013.01)

(58) Field of Classification Search
CPC .......... G01R 31/3177; G01R 31/31719; G01R 31/3181; G01R 31/3183; G01R 31/31725; G01R 31/318533; G01R 31/318536; G01R 31/318544; G01R 31/318588; G06F 1/08; G06F 17/505; G06F 11/25; H04L 9/10; G11C 7/24; G11C 2029/3202
USPC .............................. 714/734, 726, 729, 727
See application file for complete search history.

(56) References Cited

U.S. PATENT DOCUMENTS 5,072,138 A * 12/1991 Slemmer .......... G01R 31/31701
                                                         326/16
5,903,578 A      5/1999  De et al.
(Continued)

FOREIGN PATENT DOCUMENTS

EP          1439398     *  7/2004  ........... G01R 31/317

OTHER PUBLICATIONS

Lee et al., A Low-Cost Solution for Protecting IPs Against Scan-Based Side-Channel Attacks, 2006, IEEE, pp. 1-6.*
(Continued)

*Primary Examiner* — John J Tabone, Jr.
(74) *Attorney, Agent, or Firm* — Foley & Lardner LLP

(57) ABSTRACT

Embodiments relate to providing security of scan mode access and data in an integrated circuit. In embodiments, one or both of two layers of security are provided. A first layer includes requiring a complex initialization sequence to be performed in order to access scan mode. A second layer includes scrambling the scan data before it is output from the circuit under test, which prevents unauthorized persons from extracting useful information from the output scan data. Further embodiments relate to methodologies for utilizing these protection layers after manufacture of the integrated circuit and incorporating these protection layers in an integrated circuit design flow.

17 Claims, 8 Drawing Sheets

(51) Int. Cl.
*G06F 17/50* (2006.01)
*G11C 7/24* (2006.01)
*G06F 11/25* (2006.01)
*G11C 29/32* (2006.01)

(56) References Cited

U.S. PATENT DOCUMENTS

| | | | |
|---|---|---|---|
| 5,938,779 A | 8/1999 | Preston | |
| 7,185,249 B2* | 2/2007 | Tkacik | G01R 31/31719 326/16 |
| 7,490,231 B2* | 2/2009 | Turner | G01R 31/31719 713/1 |
| 7,725,788 B2* | 5/2010 | Tkacik | G01R 31/31719 714/726 |
| 7,795,893 B2* | 9/2010 | Agatsuma | G01R 31/318544 324/750.3 |
| 8,438,436 B1* | 5/2013 | Baker | G01R 31/31858 714/34 |
| 9,170,297 B2* | 10/2015 | Pugliesi-Conti | G01R 31/3177 |
| 9,224,012 B2* | 12/2015 | Wu | G06F 21/74 |
| 9,746,519 B2* | 8/2017 | Pugliesi-Conti | G01R 31/31858 |
| 9,927,490 B2* | 3/2018 | Hao | G01R 31/3177 |
| 2003/0204801 A1* | 10/2003 | Tkacik | G01R 31/31719 714/726 |
| 2004/0196970 A1* | 10/2004 | Cole | H04L 9/00 380/1 |
| 2006/0020864 A1* | 1/2006 | Turner | G01R 31/31719 714/726 |
| 2006/0136751 A1* | 6/2006 | Bonaccio | G06F 12/1433 713/194 |
| 2007/0226562 A1* | 9/2007 | Tkacik | G01R 31/31719 714/726 |
| 2008/0104462 A1 | 5/2008 | Volz et al. | |
| 2008/0201592 A1* | 8/2008 | Lawrence | G01R 31/31719 713/323 |
| 2009/0132882 A1 | 5/2009 | Chen | |
| 2009/0307411 A1* | 12/2009 | GadelRab | G01B 31/31855 711/103 |
| 2009/0307502 A1* | 12/2009 | GadelRab | B82Y 25/00 713/193 |
| 2009/0315582 A1* | 12/2009 | Agatsuma | G01R 31/31701 324/750.3 |
| 2010/0107023 A1* | 4/2010 | Guettaf | G01R 31/31719 714/728 |
| 2010/0333055 A1* | 12/2010 | Yu | G01R 31/31719 716/108 |
| 2011/0314514 A1* | 12/2011 | Goyal | G01R 31/31719 726/2 |
| 2012/0246528 A1* | 9/2012 | Pugliesi-Conti | G01R 31/31858 714/726 |
| 2013/0166977 A1* | 6/2013 | Pugliesi-Conti | G01R 31/3177 714/727 |
| 2014/0344919 A1* | 11/2014 | Wu | G06F 21/74 726/17 |
| 2016/0070933 A1* | 3/2016 | Geukes | G01R 31/31719 726/34 |
| 2017/0089978 A1* | 3/2017 | Hao | G01R 31/3177 |
| 2017/0103157 A1* | 4/2017 | Hutton | G06F 17/5027 |

OTHER PUBLICATIONS

Da Rolt et al., Thwarting Scan-Based Attacks on Secure-ICs with On-Chip Comparison, Jul. 5, 2013, IEEE, pp. 1-4.*

* cited by examiner

SECURING ACCESS TO INTEGRATED CIRCUIT SCAN MODE AND DATA

TECHNICAL FIELD

Embodiments relate generally to electronic security and more specifically to security of scan mode access and data in an integrated circuit.

BACKGROUND

During the design of an application specific integrated circuit (ASIC) or system-on-chip (SOC), design for test (DFT) and automatic test pattern generation (ATPG) methodologies are typically used to develop a test sequence that, when applied to the ASIC or SOC, can detect potential failures of the ASIC or SOC. After the ASIC or SOC has been manufactured, it can be placed into scan mode, which forces all the flip-flops in the device to be connected in a simplified fashion, and these test sequences can be used to test all the flip-flops, as well as to trace failures to specific flip-flops.

Data theft from scan mode is an emerging challenge. While the chips are in functional mode, the registers may contain important identification details. Critically private data such as passwords, fingerprints, iris scans, IDs and the like can be stolen from hardware by changing the chip mode to scan mode and extracting the data from the scan mode output. Chip enabled credit cards and smart cards are particularly vulnerable to such data thefts, and even automotive applications can be susceptible to identification data thefts.

SUMMARY

Embodiments relate to providing security of scan mode access and data in an integrated circuit. In embodiments, one or both of two layers of security are provided. A first layer includes requiring a complex initialization sequence to be performed in order to access scan mode. A second layer includes scrambling the scan data before it is output from the circuit under test, which prevents unauthorized persons from extracting useful information from the output scan data. Further embodiments relate to methodologies for utilizing these protection layers after manufacture of the integrated circuit and incorporating these protection layers in an integrated circuit design flow.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein.

DETAILED DESCRIPTION OF THE PREFERRED EMBODIMENTS

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

According to certain aspects, the present applicants recognize that as more personal data is stored in silicon (e.g. fingerprints, iris data, etc.), the risk of hackers getting access to this personal data and unloading it through test mode capabilities designed into the chip is a growing concern. The present embodiments provide one or more layers of protection to integrated circuit designs to help minimize data loss such as theft of data stored in the integrated circuit.

Figure 1:
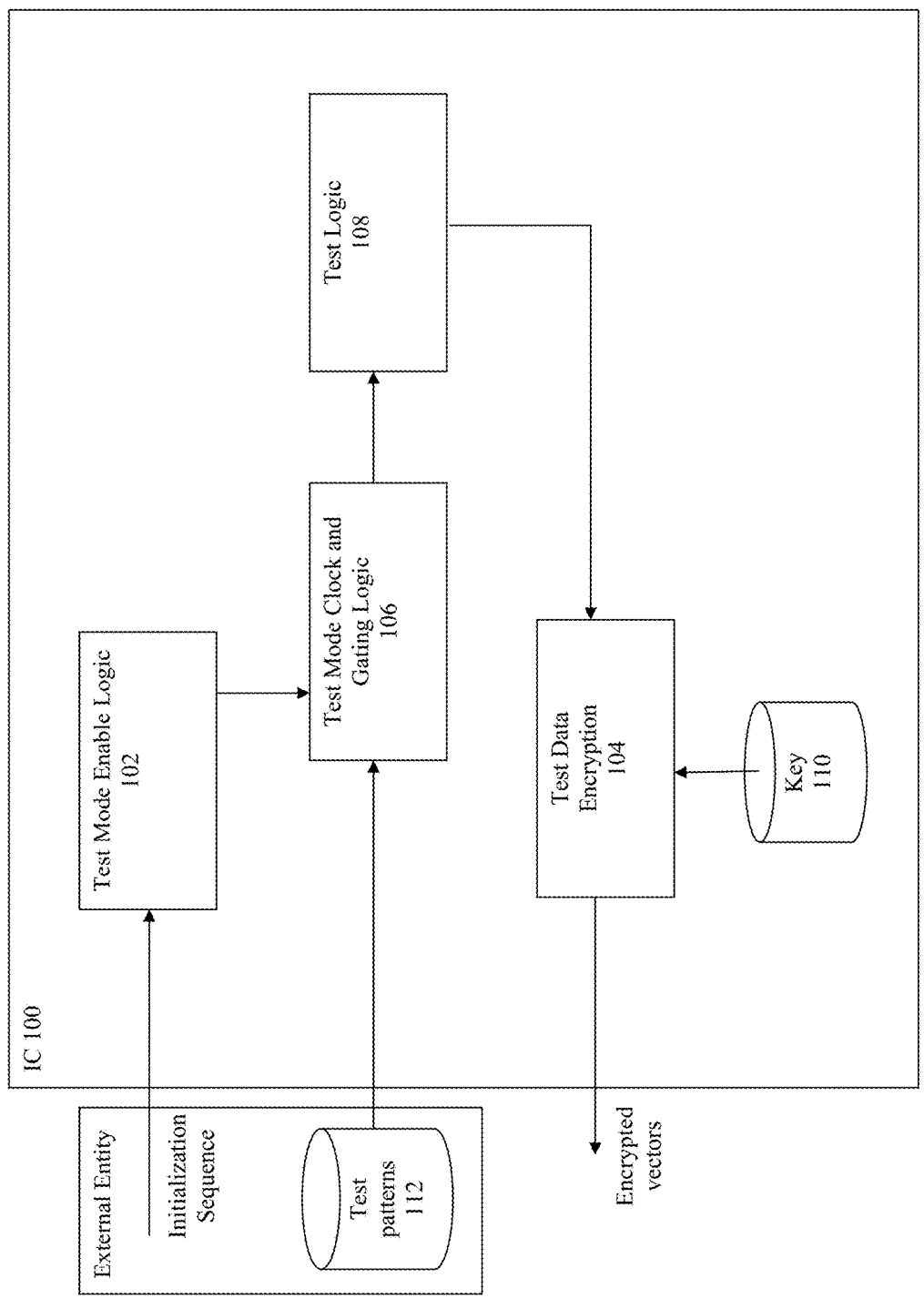
FIG. 1 is a block diagram illustrating an example approach for scan security in an integrated circuit according to embodiments.

An example approach for scan security in an integrated circuit (IC) 100 according to embodiments is shown in FIG. 1. In embodiments, IC 100 is an ASIC or SOC that has been designed using DFT and/or ATPG methodologies in a design flow that has been adapted in accordance with embodiments described in more detail below. However, the principles of the embodiments are not limited to this example.

In this example, two layers of protection are provided, although either layer may be provided without the other in other examples. A first layer is provided by test mode enable logic 102. In many conventional designs, in order to enter test mode, it is simply a matter of raising a predefined pin on IC 100 high to allow access to scan configurations. According to certain general aspects, test mode enable logic 102 adds hardware that requires a predefined mode initialization process and sequence to be performed by external entities in order to access and setup the test configuration.

In this example, IC 100 includes test mode clock and gating logic 106 which can only be enabled for operation by test mode enable logic 102. Once enabled, test mode clock and gating logic controls test mode operation using test logic 108. For example, test logic 108 can include a scan chain of interconnected flip-flops in functional logic of the IC 100 (e.g. processors, memories, etc.), which scan chain is exercised in a scan mode using predefined test patterns 112 (e.g. patterns generated during a design processing using ATPG methodologies). In embodiments such as that shown in FIG. 1, the test patterns 112 are stored by an external entity and communicated by the entity to IC 100 after successfully initializing test mode using test mode enable logic 102. However, in other embodiments, test patterns 112 can reside on IC 100 and used during test mode.

Another layer of protection is provided by test data encryption block 104. This logic block uses an encryption key 110 and perhaps other schemes to scramble the test data before it is output from IC 100. In embodiments, the key 110 is unique for each IC design and provides a means to prevent easy unloading of useful information from the scan data output from IC 100 by unauthorized entities.

For example, where test logic 108 is a scan chain that is exercised using test patterns 112, the output scan data includes expected vectors, which can further be compressed by test logic 108. In this example, the output vectors are subject to encryption by test data encryption block 104 using key 100 and only the encrypted vectors are output from IC 100. An authorized recipient of these encrypted vectors can use them to compare to expected encrypted vectors and can further decrypt them using their own copy of encryption key 100 for diagnostic purposes. It should be noted that key 110 can be loaded into IC 100 by many different methods. In some examples, the key 110 can be hard coded or hard wired (e.g. a fixed register). In other examples, key 110 can be metal mask programmable. In yet other examples, key 110 can be fuse programmable.

Figure 2:
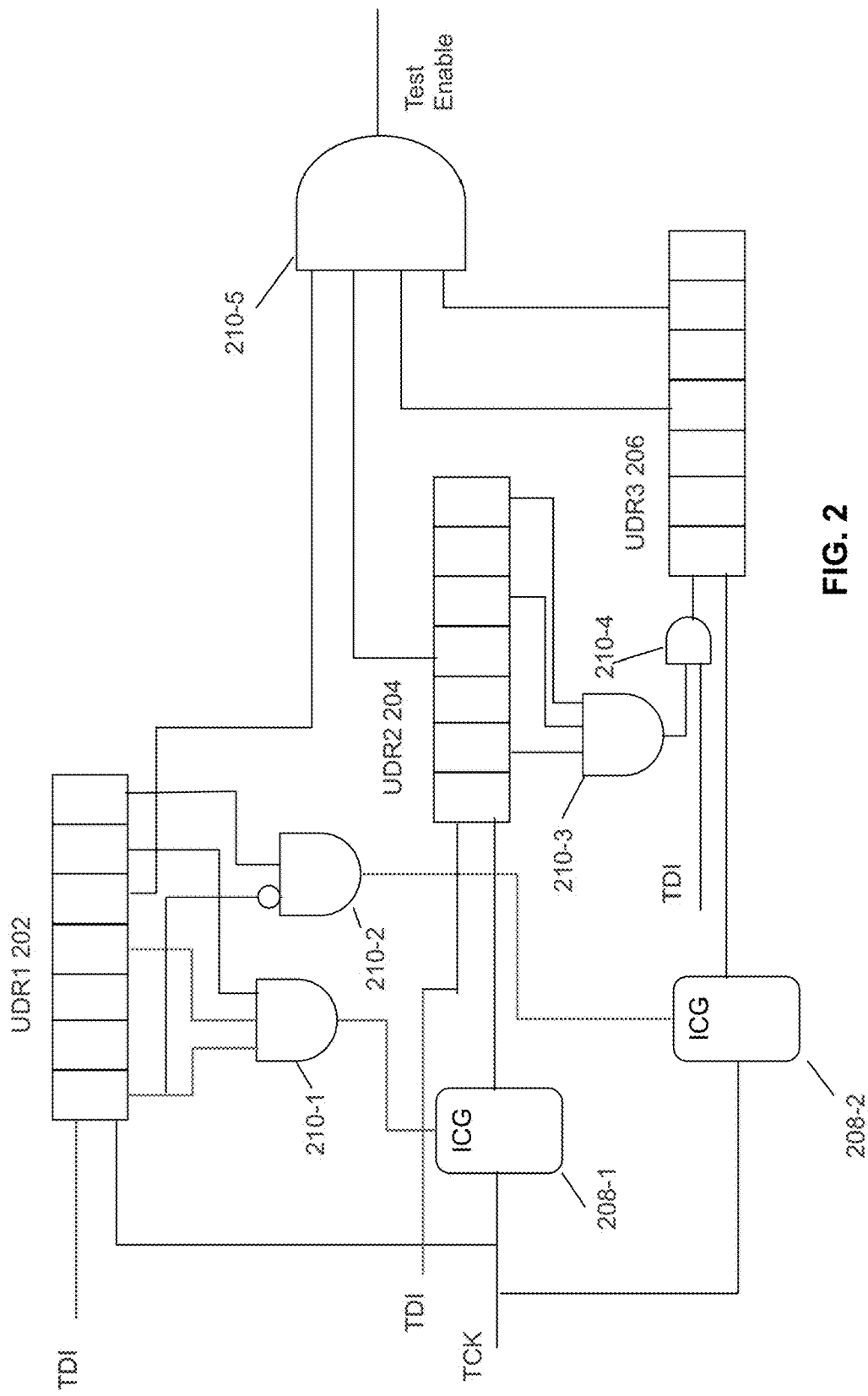
FIG. 2 illustrates an example test mode enable logic block according to embodiments.

FIG. 2 illustrates an example test mode enable logic block 102 according to embodiments. According to certain aspects, example block 102 in these embodiments employs a User Defined Register (UDR) Lock-Sample Structure.

The UDRs are a set of shift registers which are configured so as to require a specific sequence to decode and enable the test mode clock and data gating logic 106. These UDRs are implemented hierarchically and offer a multiple stage lock and key process.

As shown in FIG. 2, block 102 includes UDR1 202, UDR2 204 and UDR3 206, clock gates 208-1 and 208-2, and AND gates 210-1, 210-2, 210-3, 210-4 and 210-5. As shown, clock gate 208-1 has an enable input coupled to the output of AND gate 210-1 and clock gate 208-2 has an enable input coupled to the output of AND gate 210-2. AND gate 210-1 has three inputs coupled to respective different bits in UDR1 202. AND gate 210-2 has two inputs coupled to respective different bits in UDR1 202, with one input being inverted. UDR3 206 has data input enabled by AND gate 210-4, which is in turn enabled by the output of AND gate 210-3 having three inputs coupled to respective different bits in UDR2 204. The test enable signal is provided by the output of AND gate 210-5, which has four inputs coupled to a combined total of four respective bits in UDR1 202, UDR2 204 and UDR3 206.

The test data input (TDI) and test clock (TCK) signals are connected to pins on IC 100 for access by external entities. In operation, a data bit on signal line TDI provided by an external entity is clocked into the UDR's when a clock pulse is exercised on line TCK. For example, when signal line TDI is set to a logic "1" state and a clock pulse is exercised on line TCK, the left most bit in the UDR will be set to a logic "1" and all the other bits in the UDR will shift to the right. Likewise, when signal line TDI is set to a logic "0" state and a clock pulse is exercised on line TCK, the left most bit in the UDR will be set to a logic "0" and all the other bits in the UDR will shift to the right. It should be noted that other loading mechanisms are possible.

Figure 3:
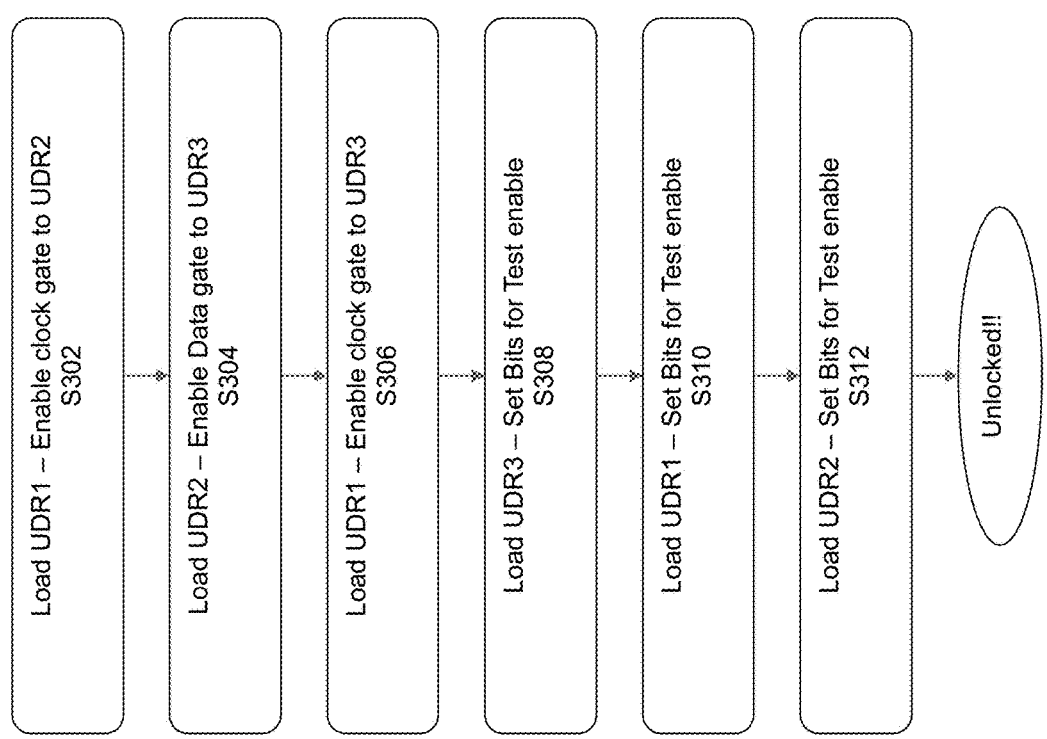
FIG. 3 is a flowchart illustrating an example process to unlock/gain access to the test mode using an example test mode enable logic block such as that illustrated in FIG. 2.

FIG. 3 illustrates a sample process to unlock/gain access to the test mode using an example test mode enable logic block 102 such as that illustrated in FIG. 2.

As shown, in a first step S302, UDR1 202 is loaded with a pattern that enables the clock gate 208-1 to UDR2 204. In the example shown in FIG. 2, the pattern includes logic "1" bits in the three UDR1 202 register bit locations that are coupled to the three inputs of AND gate 210-1. This causes the output of AND gate 210-1 to transition to a logic "1" state, which enables clock gate 208-1 to UDR2 204.

In a next step S304, UDR2 204 is loaded with a pattern that enables the data gate 210-4 to UUDR3 206. In the example shown in FIG. 2, the pattern includes logic "1" bits in the three UDR2 204 register bit locations that are coupled to the three inputs of AND gate 210-3. This causes the output of AND gate 210-4 to transition to a logic "1" state, which enables AND gate 210-4 to couple the TDI signal to UDR3 206.

In a next step S306, UDR1 202 is loaded with a pattern that enables the clock gate 208-2 to UDR3 206. In the example shown in FIG. 2, the pattern includes a logic "1" bit in one UDR1 202 register bit location that is coupled to the non-inverting input of AND gate 210-2, and a logic "0" bit in one UDR1 202 register bit location that is coupled to the inverting input of AND gate 210-2. This causes the output of AND gate 210-1 to transition to a logic "1" state, which enables clock gate 208-2 to UDR3 206. It should be noted that, in order to prevent an out-of-sequence enabling of clock gate 208-2, the inverting input of AND gate 210-2 is coupled to the same register bit location in UDR1 202 that is used in step S302.

In a next step S308, UDR3 206 is loaded with a pattern that enables two of the four inputs of AND gate 210-4 to transition to a logic "1" state. Then in step S310, UDR1 202 is loaded with a pattern that enables a third one of the four inputs of AND gate 210-4 to transition to a logic "1" state. And finally in step S312, UDR2 204 is loaded with a pattern that enables the fourth one of the four inputs of AND gate 210-4 to transition to a logic "1" state. This causes the output of AND gate 210-4 to transition to a logic "1" state, which enables test mode.

The complexity of the test mode access protection provided by logic block 102 in these embodiments can be quantified as follows:

Length of UDRs are UDR1=a, UDR2=b, UDR3=c

Number of times UDRs are loaded: UDR1=p, UDR2=q, UDR3=r

The number of exhaustive attempts required: $2^{(pa+qb+rc)}$

Compared to approaches using a single TDR, the hierarchical approach of the present embodiments saves hardware resources, since a single TDR would require a register length of $\log_2(2^{(pa+qb+rc)})$=pa+qb+rc. By comparison, the total register length with this technique is a+b+c.

Figure 4:
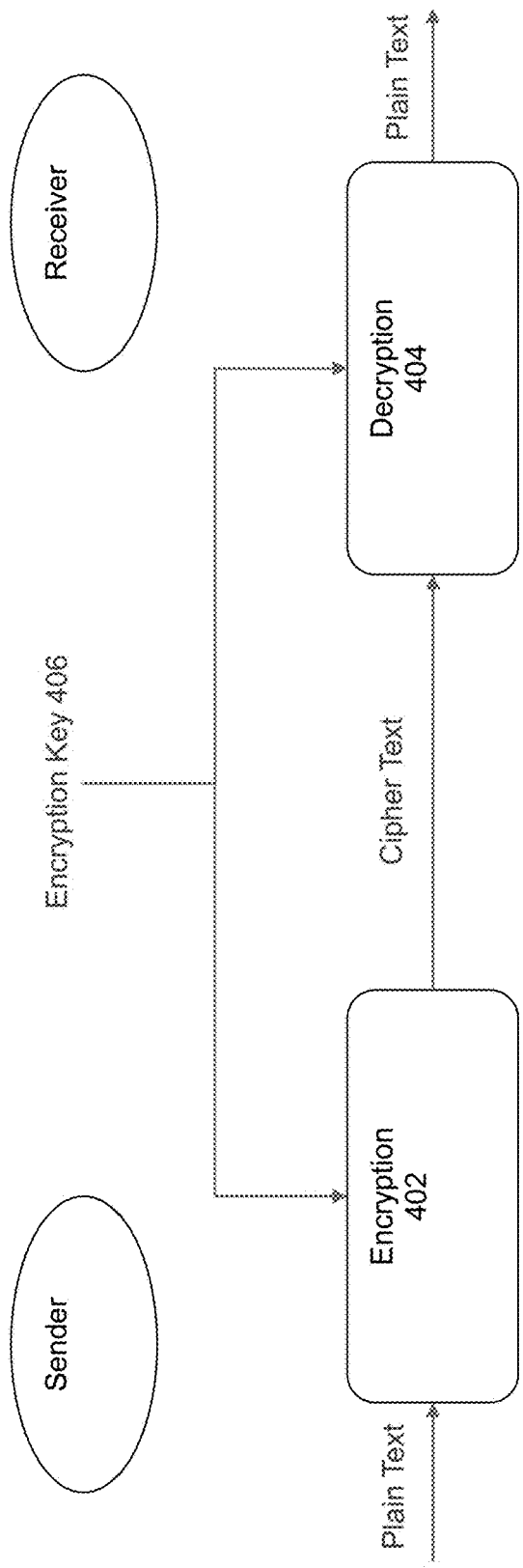
FIG. 4 is a diagram illustrating a basic overview of symmetric encryption.

FIG. 4 is a diagram illustrating a basic overview of symmetric encryption. As shown, a sender of plain text encrypts the data in an encryption block 402 using encryption key 406, which converts the plain text to encrypted cipher text. The receiver of the encrypted cipher text converts it back to plain text in a decryption block 404 using encryption key 406. Thus, in a "symmetric" encryption scheme as shown in FIG. 4, as long as the sender and receiver both have access to the same encryption key 406, the cipher text can be communicated "in the clear" between the sender and receiver, without risk of the plain text being compromised or easily extracted from the cipher text.

Figure 5:
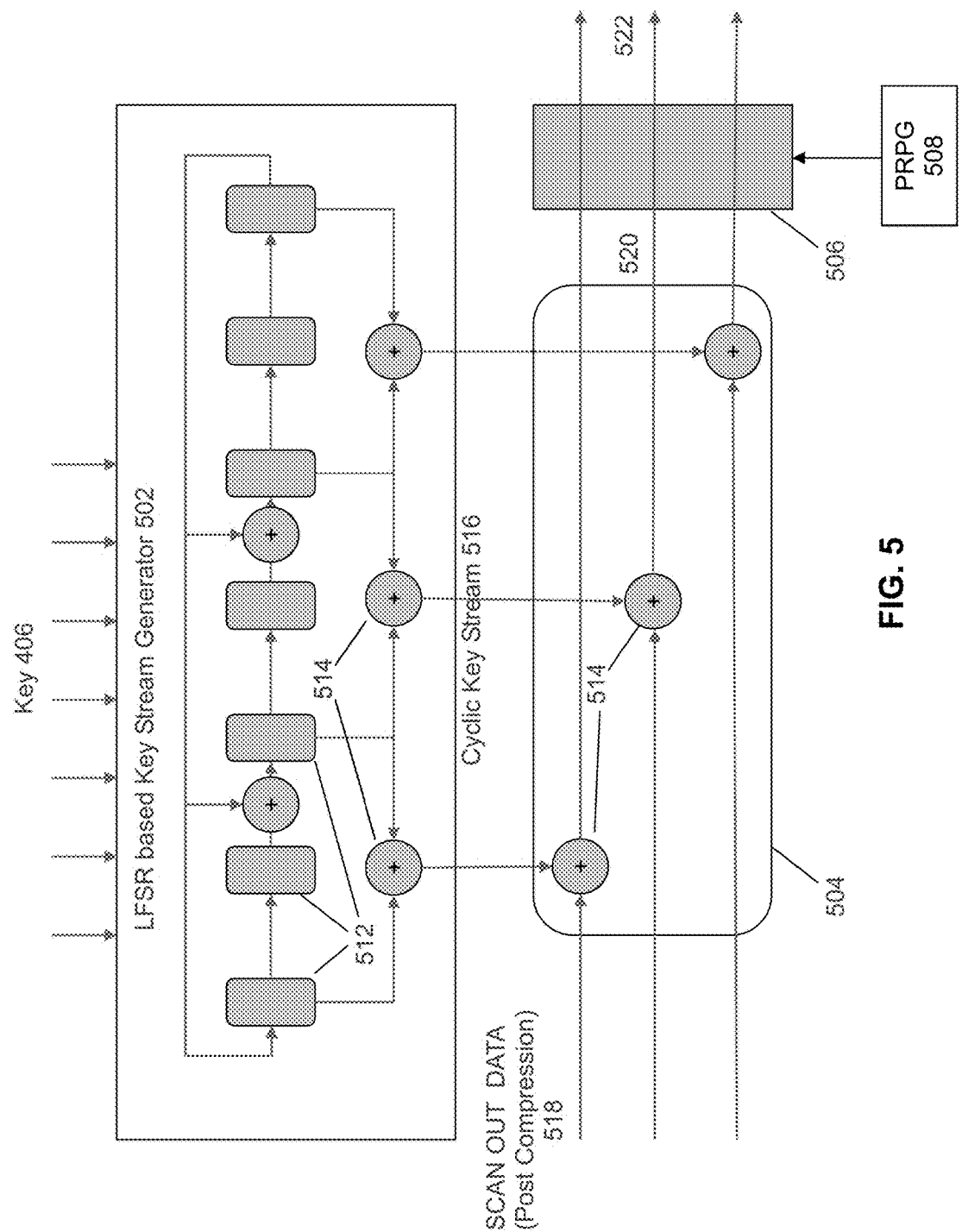
FIG. 5 is a diagram illustrating an example encryption block that can be used to encrypt test data according to embodiments.

FIG. 5 is a diagram illustrating an example encryption block 402 that can be used in test data encryption block 104 according to embodiments. Those skilled in the art will be able to understand how to implement a corresponding decryption block 404 for use in a receiver based on these examples. It should be noted, however, that such a decryption block 404 may be implemented partially or fully in software.

As shown, an LFSR based key stream generator 502 is used to generate a cyclic key stream 516. The initial contents of the LFSR bits 512 is the key 406 that is used to encode and decode the data. As shown, these bits are shifted right during operation and fed back from the right-most bit to the left-most bit in a serial fashion. The bits at fixed locations in the shift register 512 are also provided to combiners 514, which perform logical operations such as logical AND/OR/XOR operations to generate a cyclic key stream 516. In embodiments, the key stream 516 contains as many bits as the number of bits in the scan data stream 518. This diagram shows the number of bits in stream 516 and 518 as three, but any number of bits is possible (and four is preferable in some embodiments).

The cyclic key stream 516 generated by LFSR 502 is combined with the scan data stream 518 in modulator block 504 to obtain an intermediate encoded data stream 520. The intermediate encoded stream 520 is processed with a non-linear randomizer 506 to generate cipher text. A pseudorandom pattern generator (PRPG) 508 provides random row selection bits that are used in embodiments to select bits that are substituted for the bits in intermediate encoded data stream 520 as will be described in more detail below.

It should be noted that randomizer 506 is optional and need not be included in all embodiments.

Figure 6:
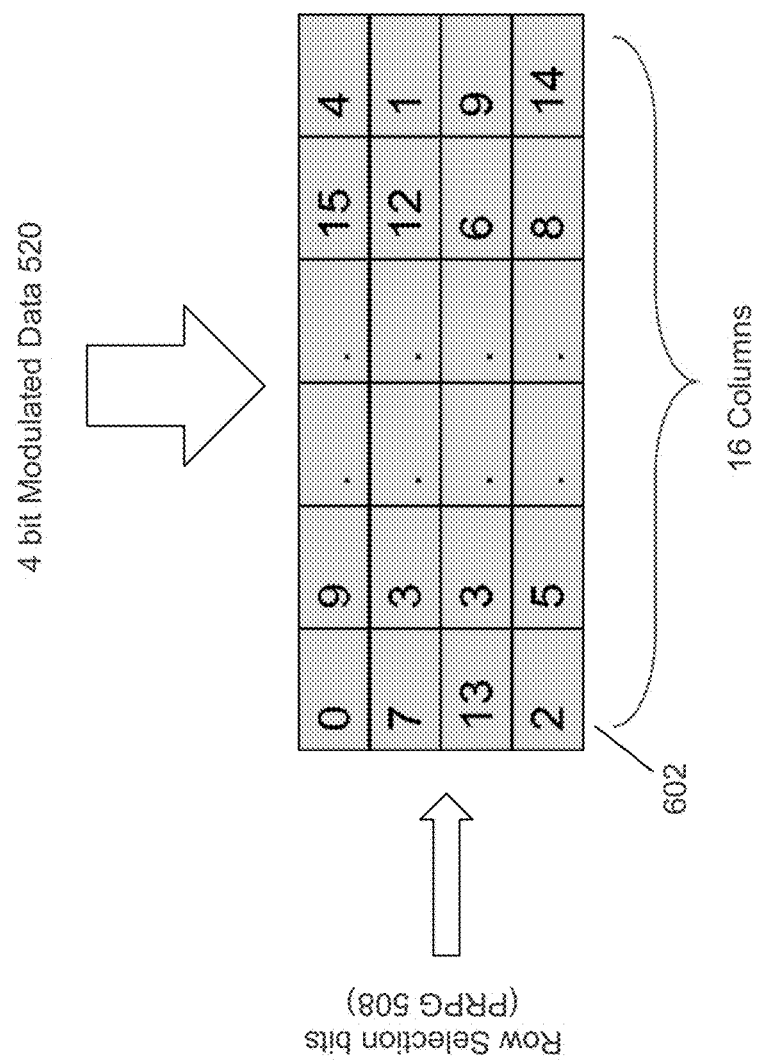
FIG. 6 is a diagram illustrating an example randomizer that can be optionally included in encryption block such as that shown in FIG. 5 according to embodiments.

FIG. 6 is a diagram illustrating a randomizer 506 that can be optionally included in encryption block 402 according to embodiments.

The randomizer performs random substitution of the bits in the intermediate encoded data stream 520 with selected bits from substitution table 602. In embodiments, the substitution is based on one of the four substitution table rows selected from the two random bits generated from the PRPG 508, while the individual one of the sixteen columns of table 602 is selected from the bits in the intermediate encoded data stream 520. The entries in the table 602 are each 4 bits and so the selected row/column entry is used to replace the 4 bits in the intermediate encoded data stream 520.

The entries in the table 602 should be unique and not derived or obtained from a linear function. More particularly, since each row in the table represents one possible substitution, the data in one substitution row should not be a function on or dependent on the data in any other rows. Preferably, the entries should be randomly generated. However, as should be appreciated, once generated for a given IC design, table 602 remains fixed and known to an authorized tester, as well as the PRPG 508 and its seed, so that an authorized tester can de-scramble the scan data if necessary.

Figure 7:
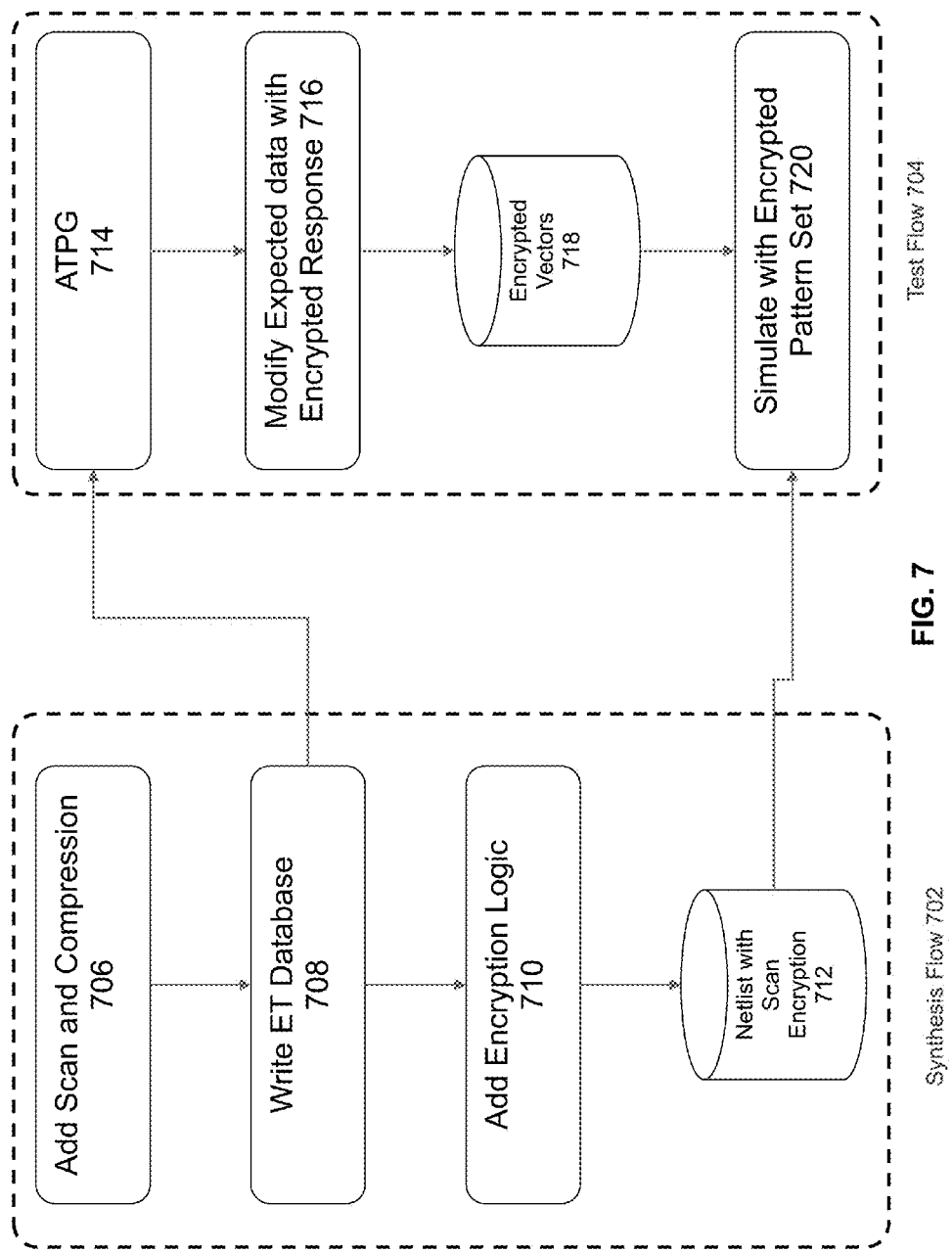
FIG. 7 is a diagram illustrating an example of how an integrated circuit design flow can be adapted to incorporate the protection features of the present embodiments into a design.

FIG. 7 is a diagram illustrating an example of how an integrated circuit design flow can be adapted to incorporate the protection features of the present embodiments into a design for an ASIC or SOC.

As shown, the flow includes a synthesis flow 702 and a test flow 704. Synthesis flow 702 can be implemented by adapting a RTL synthesis and physical synthesis design tool with functionality for incorporating the protection features of the present embodiments. Test flow 704 can be implemented by adapting a physically-aware ATPG design tool with functionality for incorporating the protection features of the present embodiments. Those skilled in the art of such design tools will understand how to adapt them so as to support the features of synthesis flow 702 and test flow 704 after being taught by the present examples.

Synthesis flow 702 and test flow 704 can be included in a system also comprising one or more EDA modules for assisting a user to interactively implement integrated circuit designs, the EDA modules including one or more of a placer, a routing engine, a design rule checker, a floorplanner, a layout editor, a power integrity signoff engine, an implementation engine, an optimization engine and/or a timing analysis and signoff engine, etc. as will be appreciated by those skilled in the art. In other embodiments, one or both of synthesis flow 702 and test flow 704 can be a standalone application that only includes one or some of these modules and/or is adapted to communicate with other EDA modules.

In embodiments, a system incorporating synthesis flow 702 and test flow 704 can be implemented by one or more general purpose computers that are loaded with an operating system executing software and/or customized to include hardware for interactively implementing physical electronic designs (e.g. designs stored in a GDS II data format) and adapted with the protection functionality of the present disclosure. In some embodiments, the one or more computing systems comprise various components not shown such as the processor(s) or processor core(s), memory, disks, etc. The one or more computing systems may further write to and read from a local or remote volatile or non-volatile computer accessible storage not shown that stores thereon data or information such as, but not limited to, one or more databases such as schematic design database(s) or physical design database(s), libraries, data, rule decks, constraints, etc. and/or other information or data that may be required to support the methodology of the present embodiments. In some embodiments, the one or more computing systems are implemented in a "cloud" configuration and/or a client/server configuration. For example, one or more server computers may be loaded with application software (e.g., a synthesis tool and test tool) for implementing some or all of the methodology of the present embodiments, and one or more client computers can communicate with the server computer(s) via a network to perform some or all of the methodology of the embodiments for a particular design.

Returning to the example shown in FIG. 7, synthesis flow 702 includes a block 706 where stitching between flip-flops in the design is performed so as to form a scan chain. This can be done using any one of a variety of known and proprietary methods. As shown, block 706 also includes adding compression logic to the design for compressing scan data that is output from the ASIC or SOC during a scan. Synthesis flow 702 further includes block 708, where ATPG is performed to generate test setup files and patterns which can be used to exercise the scan chain created in block 706 and written to a database. In block 710, encryption logic is added to the design, such as the example logic illustrated in connection with FIG. 5. In some embodiments where the unique encryption key is hard wired or hard coded in the encryption logic, information about the unique key is saved. In embodiments, block 710 further includes adding test mode enable logic to the design such as the example logic illustrated in connection with FIG. 2, or this can be included in block 706.

As shown, blocks 706, 708 and 710 included in flow 702 allow a netlist 712 of the integrated circuit to be generated that includes scan encryption logic and test mode enable logic according to the embodiments. It should be noted that, in addition to the netlist, in embodiments where the unique encryption key for this design is hard coded or hard wired, information about the encryption key is saved and/or otherwise made available for post-manufacture testing of the integrated circuit by authorized persons. Still further, information about the test enable logic is saved and/or otherwise made available for enabling access to scan mode during post-manufacture testing of the integrated circuit by authorized persons.

As further shown in FIG. 7, test flow 704 includes block 714 where ATPG processing is performed, which can be implemented using any known or proprietary techniques known to those skilled in the art. Notably however, block 714 references the patterns in the database written in block 708 of synthesis flow 702. The result of block 714 is a set of expected data that is returned from the scan chain during scan tests (perhaps after compression), and which can be used to determine whether the integrated circuit has a fault. Block 716 therefore modifies this expected data based on the encryption logic that has been added to the design in flow 702. This results in a set of encrypted test vectors 718 that can be provided separately along with the completed integrated circuit design and the encryption key to allow for testing the integrated circuit after it has been manufactured. As shown in the example of FIG. 7, the encrypted vectors 718 can also be used to perform simulation of the design in block 720.

Figure 8:
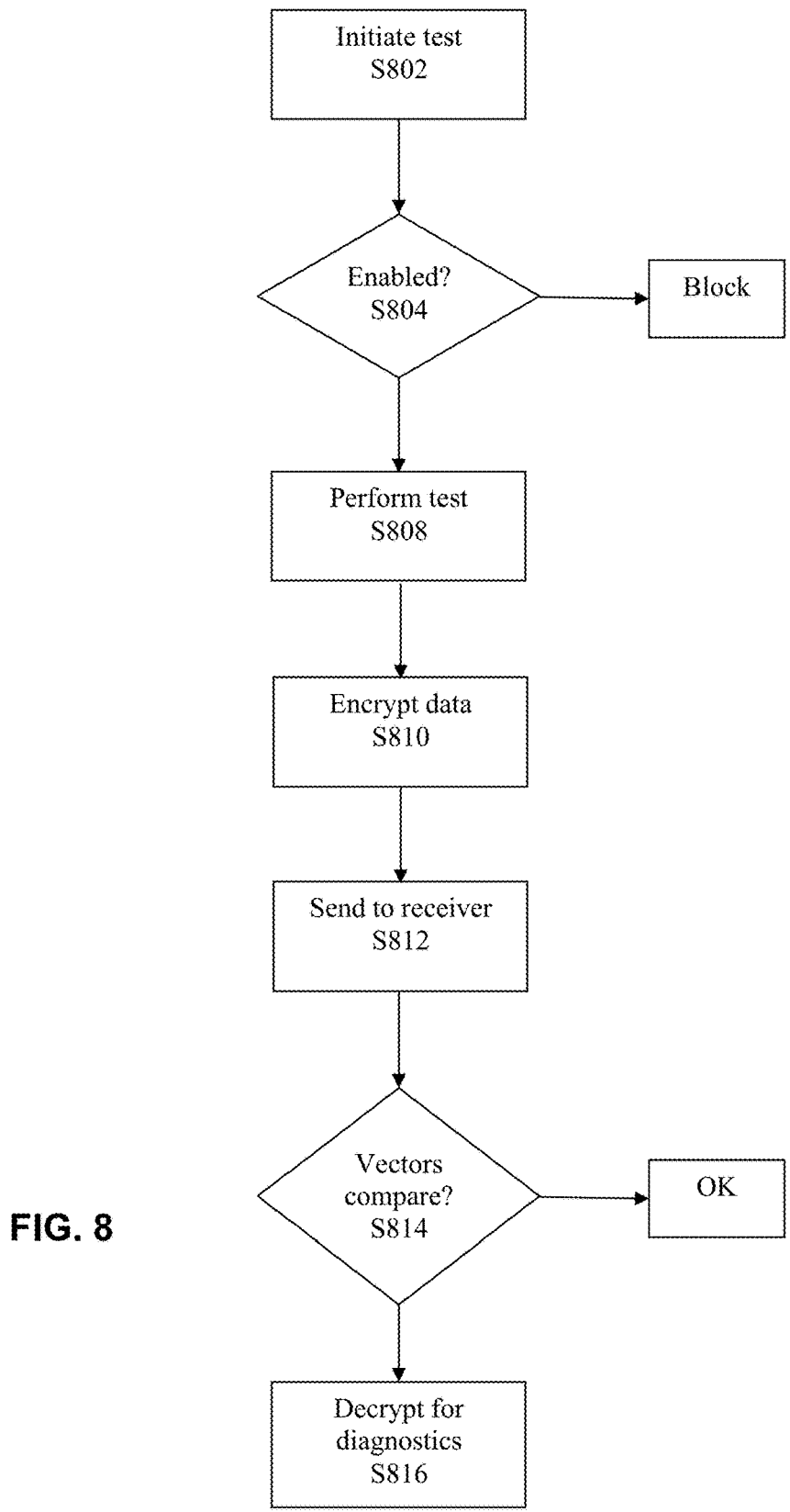
FIG. 8 is a flowchart illustrating an example methodology for protecting scan mode data in an ASIC or SOC according to embodiments.

FIG. 8 is a flowchart illustrating an example methodology for protecting scan mode data in an ASIC or SOC according to embodiments.

As shown, scan mode is initiated in step S802. For example, this can be done when a system including the ASIC or SOC is operating improperly or at a predetermined time such as after manufacture. According to embodiments, step S802 can include interacting with the test mode enable logic 102 in the integrated circuit such as that illustrated in connection with FIG. 2 and using the sequence described in connection with FIG. 3.

If it is determined in step S804 that test mode is successfully enabled, processing proceeds to step S806, where a scan is performed using the scan chain in the integrated circuit. This can be done according to any number of known and proprietary techniques, and can further include compressing the scan data that is to be returned.

Next in step S808 the scan data (perhaps after compression) is encrypted. This can be done using an encryption block such as that described above in connection with FIG. 5 and using an encryption key that is only known to authorized persons (e.g. hard wired or hard coded in the design, or programmed into the integrated circuit via a fuse or other mechanism). In some embodiments, the encrypted scan data is further randomized. However, this additional step is optional.

In step S810 the encrypted scan data is sent to the receiver and in step S812, the encrypted scan data is compared to encrypted vectors such as those generated in a test flow such as test flow 704 described above. In the example of FIG. 8, if the result of step S812 indicates a fault, processing can proceed to step S814 where the scan data is decrypted so that diagnostics can be performed using any number of known or proprietary techniques.

Although the present embodiments have been particularly described with reference to preferred ones thereof, it should be readily apparent to those of ordinary skill in the art that changes and modifications in the form and details may be made without departing from the spirit and scope of the present disclosure. It is intended that the appended claims encompass such changes and modifications.

What is claimed is:

1. An integrated circuit comprising:
   test logic that is at least partially formed from functional logic in the integrated circuit, wherein data from the test logic is output to an external entity during a test mode of the integrated circuit; and
   test mode enable logic that prevents access to the test mode unless a predetermined initialization sequence is loaded into a shift register of the test enable logic by the external entity,
   wherein the test mode enable logic comprises a plurality of hierarchically connected registers and a clock control gate, and
   wherein the plurality of hierarchically connected registers includes a first register that, when loaded with a first predetermined pattern of the predetermined initialization sequence by the external entity, enables the clock control gate such that a second register can be loaded by the external entity.

2. The integrated circuit of claim 1, wherein the test logic is a scan chain and the test mode is a scan mode.

3. The integrated circuit of claim 2, further comprising test mode clock and gating logic that enables predetermined patterns to be provided to the scan chain during the scan mode, wherein the data output from the scan chain in response to the predetermined patterns can be used to determine if the integrated circuit is operating properly.

4. The integrated circuit of claim 1, wherein the test mode enable logic includes a logic gate that generates a test enable signal for allowing access to the test mode when predetermined inputs are supplied to it, and wherein the predetermined inputs are supplied when second and third predetermined patterns of the predetermined initialization sequence are loaded in the first and second registers, respectively, by the external entity.

5. The integrated circuit of claim 1, wherein the plurality of hierarchically connected registers comprise shift registers.

6. The integrated circuit of claim 1, further comprising test mode clock and gating logic that enables predetermined patterns to be provided to the test logic during the test mode, wherein the data output from the test logic in response to the predetermined patterns can be used to determine if the integrated circuit is operating properly.

7. An integrated circuit comprising:
   test logic that is at least partially formed from functional logic in the integrated circuit, wherein data from the test logic is output to an external entity during a test mode of the integrated circuit;
   test mode enable logic, comprising one or more shift registers, wherein the test mode enable logic prevents access to the test mode unless a predetermined initialization sequence is loaded into the one or more shift registers by the external entity; and test data encryption logic that encrypts the data from the test logic before it is output from the integrated circuit.

8. The integrated circuit of claim 7, wherein the test data encryption logic includes a randomizer that further randomizes the encrypted data before it is output from the integrated circuit.

9. The integrated circuit of claim 7, wherein the test logic is a scan chain and the test mode is a scan mode.

10. The integrated circuit of claim 9, further comprising test mode clock and gating logic that enables predetermined patterns to be provided to the scan chain during the scan mode, wherein the data output from the scan chain in response to the predetermined patterns can be used to determine if the integrated circuit is operating properly.

11. The integrated circuit of claim 7, wherein the test mode enable logic includes a logic gate that generates a test enable signal for allowing access to the test mode when predetermined inputs are supplied to it, and wherein the predetermined inputs are supplied when predetermined patterns of the predetermined initialization sequence are loaded in the one or more shift registers by the external entity.

12. The integrated circuit of claim 7, wherein the one or more shift registers comprises a plurality of hierarchically connected registers.

13. The integrated circuit of claim 7, further comprising test mode clock and gating logic that enables predetermined patterns to be provided to the test logic during the test mode, wherein the data output from the test logic in response to the predetermined patterns can be used to determine if the integrated circuit is operating properly.

14. The integrated circuit of claim 7, wherein the test data encryption logic uses an encryption key that is also known to the external entity.

15. A method for adding test mode security to a design of an integrated circuit, comprising:

during a synthesis flow in connection with the design of the integrated circuit, generating test logic that is at least partially formed from functional logic in the design of the integrated circuit, wherein data from the test logic is output to an external entity during a test mode of the integrated circuit; and further during the synthesis flow, generating test mode enable logic that prevents access to the test mode unless a predetermined initialization sequence is loaded into a shift register of the test mode enable logic by the external entity, wherein the test mode enable logic comprises a plurality of hierarchically connected registers and a clock control gate, and wherein the plurality of hierarchically connected registers includes a first register that, when loaded with a first predetermined pattern of the predetermined initialization sequence by the external entity, enables the clock control gate such that a second register can be loaded by the external entity, and wherein the synthesis flow is implemented by a processor executing instructions stored in a non-transitory computer-readable medium.

16. The method of claim 15, wherein generating the test logic includes stitching a scan chain using the functional logic in the design.

17. The method of claim 15, wherein the test mode enable logic includes a logic gate that generates a test enable signal for allowing access to the test mode when predetermined inputs are supplied to it, and wherein the predetermined inputs are supplied when second and third predetermined patterns of the predetermined initialization sequence are loaded in the first and second registers, respectively, by the external entity.

* * * * *